US008854619B2

(12) United States Patent
Viard et al.

(10) Patent No.: US 8,854,619 B2
(45) Date of Patent: Oct. 7, 2014

(54) MULTISPECTRAL IMAGING DEVICE WITH MOEMS TYPE FILTER FOR SATELLITE OBSERVATION

(75) Inventors: Thierry Viard, Mandelieu (FR); Frédéric Zamkotsian, Marseilles (FR)

(73) Assignee: Thales, Neuilly sur Seine (FR)

( * ) Notice: Subject to any disclaimer, the term of this patent is extended or adjusted under 35 U.S.C. 154(b) by 885 days.

(21) Appl. No.: 12/667,515

(22) PCT Filed: Jul. 3, 2008

(86) PCT No.: PCT/EP2008/005424
§ 371 (c)(1),
(2), (4) Date: May 28, 2010

(87) PCT Pub. No.: WO2009/007054
PCT Pub. Date: Jan. 15, 2009

(65) Prior Publication Data
US 2010/0245818 A1 Sep. 30, 2010

(30) Foreign Application Priority Data
Jul. 6, 2007 (FR) ..................................... 07 04907

(51) Int. Cl.
*G01J 3/28* (2006.01)
*G01J 3/02* (2006.01)
*G01J 3/06* (2006.01)
*G01J 3/12* (2006.01)

(52) U.S. Cl.
CPC .. *G01J 3/06* (2013.01); *G01J 3/021* (2013.01); *G01J 2003/1213* (2013.01); *G01J 3/2823* (2013.01); *G01J 3/02* (2013.01); *G01J 3/0229* (2013.01)
USPC ........................................................ 356/326

(58) Field of Classification Search
CPC ......... G01J 3/02; G01J 3/0229; G01J 3/2823; G01B 9/02044
USPC .................................................... 356/326–328
See application file for complete search history.

(56) References Cited

U.S. PATENT DOCUMENTS

| 5,504,575 | A  | * | 4/1996  | Stafford ......................... 356/328 |
| 6,504,943 | B1 | * | 1/2003  | Sweatt et al. .................. 356/310 |
| 6,870,619 | B1 | * | 3/2005  | Tenhunen et al. ............. 356/328 |
| 2005/0012927 | A1 | * | 1/2005  | Seyfried et al. ............... 356/328 |
| 2005/0024640 | A1 |   | 2/2005  | Fateley et al. |
| 2007/0146700 | A1 | * | 6/2007  | Kowarz et al. ................ 356/328 |
| 2007/0296969 | A1 | * | 12/2007 | Goldstein et al. ............. 356/328 |

FOREIGN PATENT DOCUMENTS

EP    0 548 830 A    6/1993

OTHER PUBLICATIONS

E A Shields, et al., "Imaging microspectrometer with space-variant adaptive dispersion incorporating a MEMS mirror array", Proceedings of the SPIE, Aug. 6, 2003, vol. 5177, No. 1.

* cited by examiner

*Primary Examiner* — Kara E Geisel
(74) *Attorney, Agent, or Firm* — LaRiviere, Grubman & Payne, LLP

(57) ABSTRACT

A multispectral imaging device for satellite observation utilizing "push broom" scanning over an observed area centered on one or more wavelengths which can be electrically controlled to produce a filtering function wavelength band, thus obviating the need for conventional stacking.

8 Claims, 6 Drawing Sheets

Acquisition displacement direction

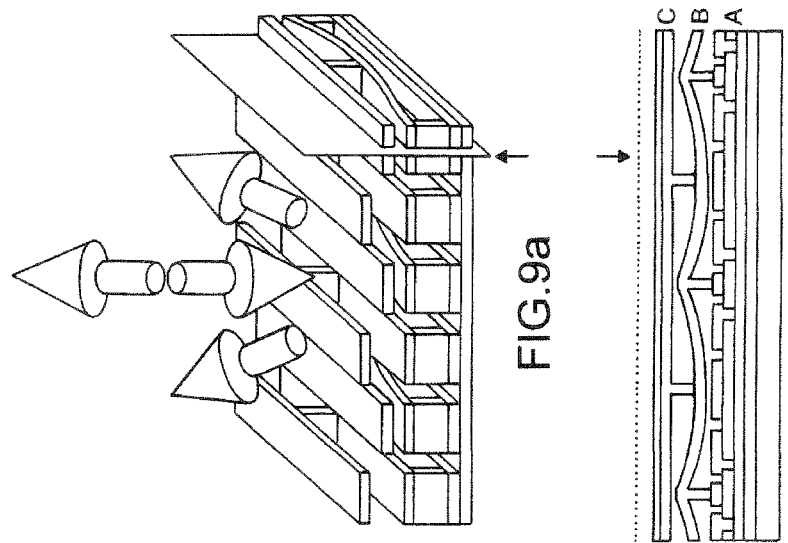
FIG.9a
FIG.9b
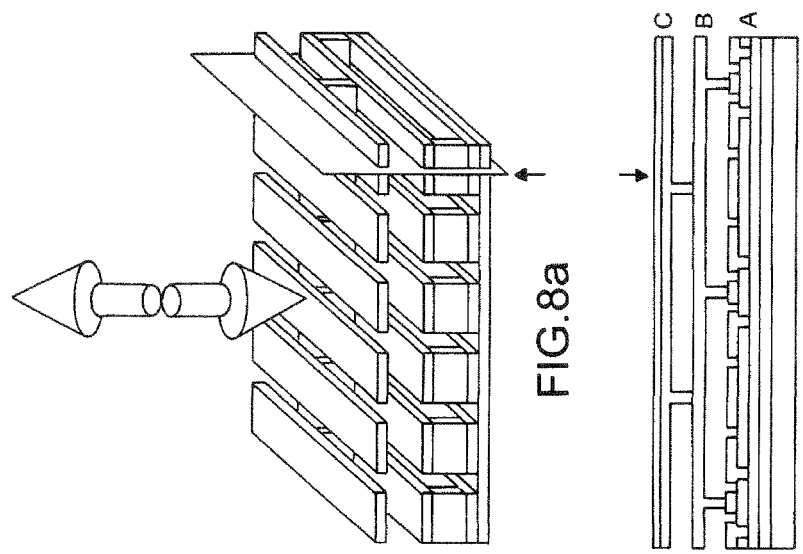
FIG.8a
FIG.8b

MULTISPECTRAL IMAGING DEVICE WITH MOEMS TYPE FILTER FOR SATELLITE OBSERVATION

PRIORITY CLAIM

This application claims priority to PCT Patent Application Number PCT/EP2008/005424, entitled Multispectral Imaging Device With MOEMS Type Filter For Satellite Observation, filed Jul. 3, 2008.

FIELD OF THE INVENTION

The invention relates to a multispectral observation device used notably for the acquisition of satellite observation images of the ground by "push-broom" scanning from strips of detectors of the charge-coupled type (CCD) for example, scrolling facing the observed area.

BACKGROUND OF THE INVENTION

The push-broom principle is illustrated in FIG. 1 diagrammatically in the case of a strip of detectors 1. This strip on board the satellite carries out the successive observation, as the satellite moves, of rows $L_1, L_2, \ldots, L_N$ perpendicular to the direction of displacement D. A wide field optic 2 forms the image of the ground on a row of detectors located in the focal plane. The row scan is obtained by reading the sensitive elements of the detection row. The scan of the landscape in the perpendicular direction results from the movement of the satellite in its orbit. It is also possible to use a spectral splitter that makes it possible in addition to conduct this observation in different spectral windows and thus produce the multispectral imaging.

In a known manner when wanting to produce a polychromatic image, strips of individual detectors are used that are coupled to interference filters as illustrated in FIG. 2 that represent the example of four filters having respective spectral bands $B_0, B_1, B_2, B_3$ physically separated by a distance $L_{i-j}$. Notably, it is known to use filters of small thickness called "match" filters. To reconstruct the various spectral components, a detector coupled to four filters of very small thickness can conventionally be used. These filters are difficult to manufacture because they are made up of stacks of thin layers on the surface of a substrate. FIG. 3 shows an example of layer stacking, typically around 20 layers distributed over both faces of a substrate may be necessary to form a filter in a given wavelength range. This type of filter notably has two types of drawbacks. The first is associated with the edge effects in an area $z_i$ that appear because of the stacking of all of these layers with a thickness of the order of $\lambda/4$ and that, given a large number of layers, embrittle the filters. The second drawback is associated with the fact that the various filters are produced in a connected way on one and the same substrate as illustrated in FIG. 3 that diagrammatically represents the production of two types of stacking that make it possible to provide filtering functions in wavelength bands $B_i$ and $B_j$. The layer stacking technologies entail imposing minimum separation distances between two filters, of the order of a few millimeters, which amounts to taking images of scenes on the ground that are several kilometers away.

SUMMARY OF THE INVENTION

In order notably to resolve this problem of excessive distance, the present invention proposes a multispectral imaging device comprising a unique structure that can be controlled electrically so as to produce a filtering function in a chosen wavelength band, and thus no longer using the conventional stacks of layers. The benefit of the invention also lies in the possibility of varying the spectral filtering function in wavelength and spectral width.

More specifically, the subject of the invention is a multispectral imaging device for satellite observation by "push-broom" scanning over an observed area, operating in N wavelength bands, respectively centered on a first wavelength $(\lambda_1), \ldots$, an nth wavelength $(\lambda_N)$ comprising:

a source emitting a light beam in a set of the N wavelength bands;
a wide-field optic;
a set of N rows of detectors making it possible to acquire images of said observed area;
optical filtering means,
characterized in that it also comprises:
a first dispersion element $(R_1, R)$ making it possible to disperse the light beam toward the filtering means;
optical filtering means comprising at least one micro-opto-electro-mechanical system (MOEMS) capable of carrying out N filtering functions for the N spectral bands, wavelength-tunable;
control means for said micro-opto-electro-mechanical system making it possible to select the filtering function;
a second dispersion element (R2) making it possible to recombine all the filtered beams at the output of the filtering means.

According to a variant of the invention, the first dispersive element is an array.

According to a variant of the invention, the first dispersive element is a prism, or an array, or a component incorporating the array and prism functions.

According to a variant of the invention, the control means for the micro-opto-electro-mechanical system include means for varying the filtering function with the same period as the acquisition time for an image corresponding to the displacement time equivalent to a scrolling row of detectors facing the observed area.

According to a variant of the invention, the device also comprises a second dispersive element that makes it possible to recombine all the filtered beams at the output of the filtering means.

According to a variant of the invention, the second dispersive element is an array, or an array, or a component incorporating the array and prism functions.

According to a variant of the invention, the first and second dispersive elements are one and the same component.

According to a variant of the invention, the micro-opto-electro-mechanical component comprises a micro-mirror structure suspended relative to a substrate, of which the distance or angle with said substrate can be controlled electrically.

According to a variant of the invention, the micro-mirror structure comprises unitary elements having lengths of a few tens of microns and widths of a few microns.

According to a variant of the invention, the unitary elements are separated by a pitch of a few microns.

According to a variant of the invention, the control means can be programmed from the ground.

BRIEF DESCRIPTION OF THE DRAWINGS

The invention will be better understood and other benefits will become apparent from reading the description that follows, given by way of nonlimiting example and from the appended figures in which:

FIGS. 8a and 8b illustrate perspective and cross-sectional views of an MOEMS component with no voltage applied;

FIGS. 9a and 9b illustrate perspective and cross-sectional views of an MOEMS component with voltage applied;

DETAILED DESCRIPTION OF THE INVENTION

Generally, the inventive device comprises wavelength filtering means to produce different colored beams so as to carry out multispectral imaging comprising an MOEMS (micro-opto-electro-mechanical system) type component, simultaneously offering mechanical, electrical and optical functions. This type of component, when judiciously associated with a dispersive element in a multispectral imaging device, makes it possible to produce a number of filtering functions in different wavelength bands using an electrical control. The spectral adjustment can be ultrafast thanks to the high speed of the MOEMS components as will be explained hereinbelow.

Figure 1:
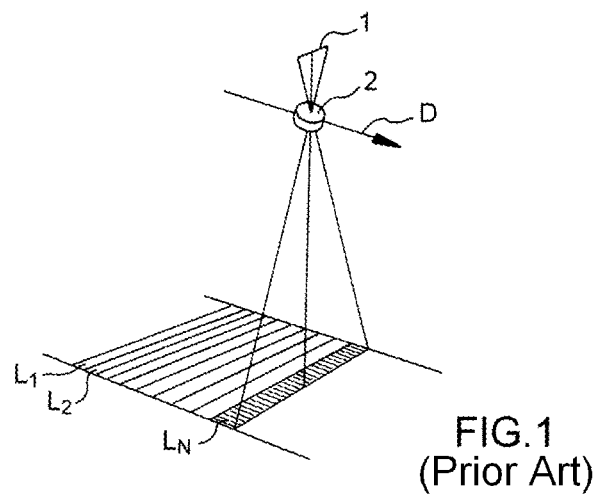
FIG. 1 diagrammatically represents an exemplary device according to the invention.
Figure 2:
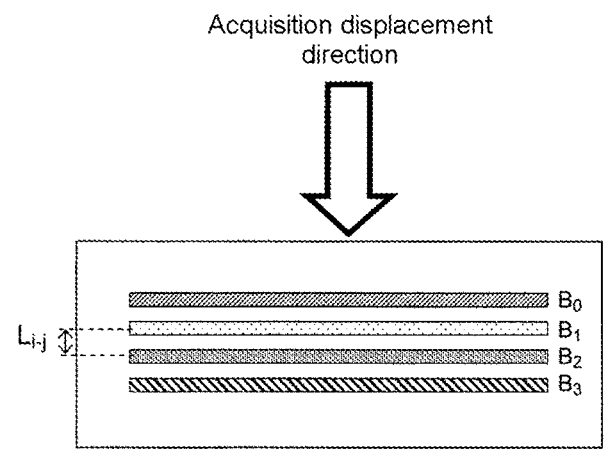
FIG. 2 illustrates an exemplary multispectral imaging device according to the state of the art using a "match" type filter.
Figure 3:
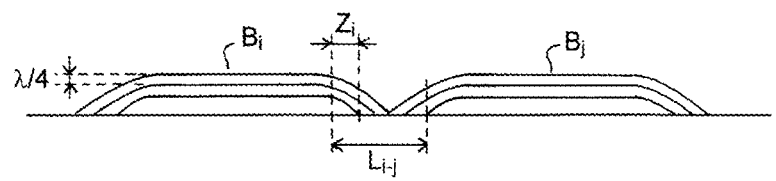
FIG. 3 illustrates a detailed view of all the layers needed to produce a "match" type filter.
Figure 4:
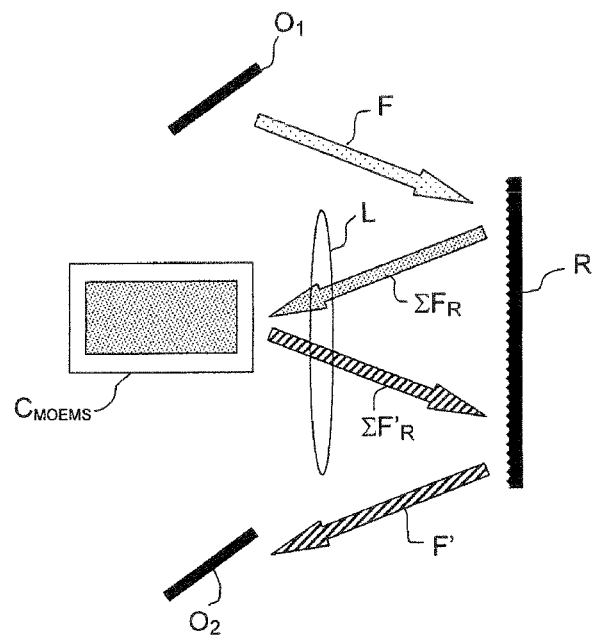
FIG. 4 illustrates a first exemplary imaging device according to the invention.

In a first exemplary embodiment of the invention, the device can comprise a single diffraction array on the incident path at the level of the MOEMS component and of the reflected path. Thus, according to one example of this type of configuration, illustrated in FIG. 4, the device comprises a wide field optic $O_1$ directing a beam F of polychromatic light emitting in a wide spectral band. The device also comprises a diffracting array R making it possible to diffract a beam $\Sigma F_R$ consisting of unitary beams $F_{Ri}$ by dispersing in different directions through a lens L, said unitary beams comprising wavelengths belonging to the spectral band. These different beams are sent to different portions of the component $C_{MOEMS}$ that provides a wavelength-controllable filtering function, by reflecting only some wavelengths in a beam $\Sigma F_R{}'$ through the lens L toward the same array R. Thus, all the wavelengths are recombined after filtering into a beam F' which, via an optic $O_2$, is sent toward the area to be observed (not represented).

Figure 5:
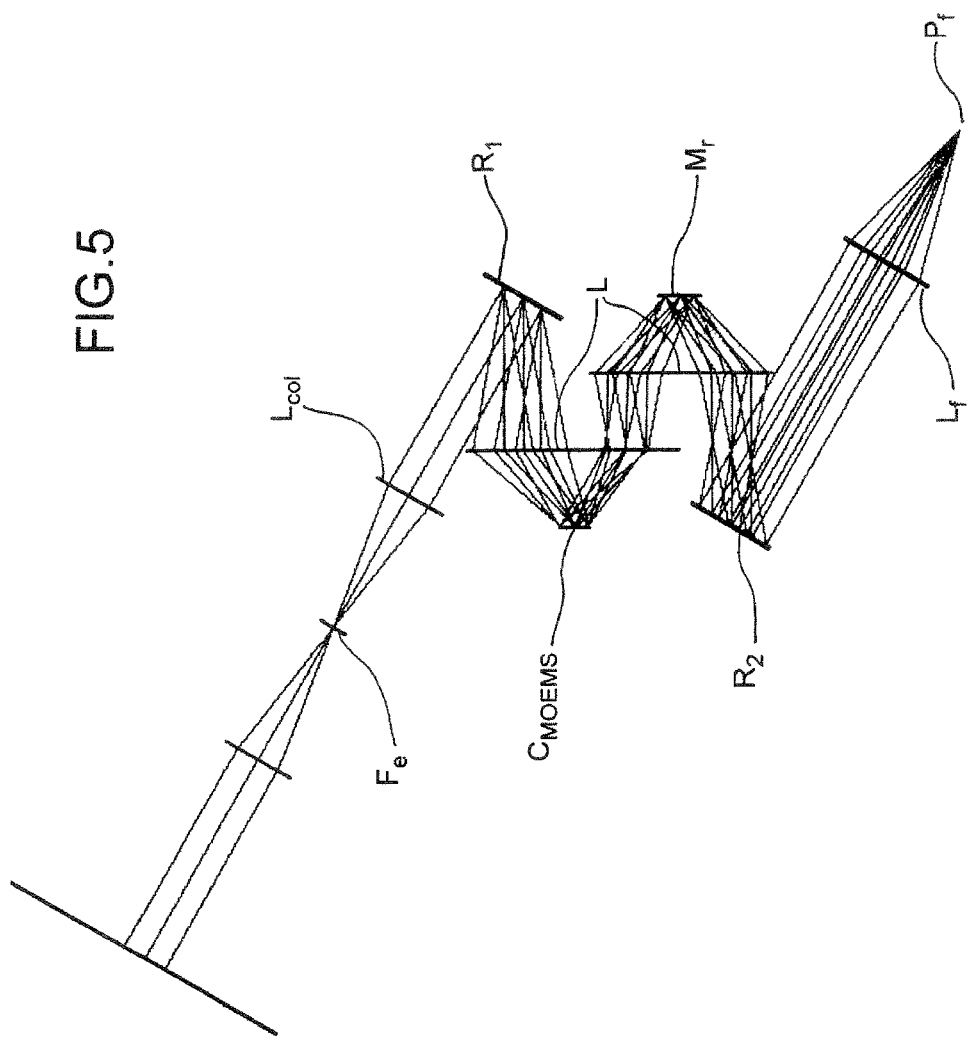
FIG. 5 illustrates a second exemplary imaging device according to the invention in which the optical combinations are highlighted.

FIG. 5 illustrates in more detail a second exemplary device according to the invention in which two arrays $R_1$ and $R_2$ are used. More specifically, an incident, light beam is sent through a slot $F_e$ toward a collimation lens $L_{col}$ and a first diffraction array $R_1$. The latter diffracts, in different directions, a beam $\Sigma F_R$ onto the component $C_{MOEMS}$ through lenses L, then is once again sent, via a mirror Mr, toward a second diffraction array $R_2$. The beam $\Sigma F_R{}'$ is then refocused using a focusing lens $L_f$ toward the focal plane $P_r$ of the detection lines.

Figure 6:
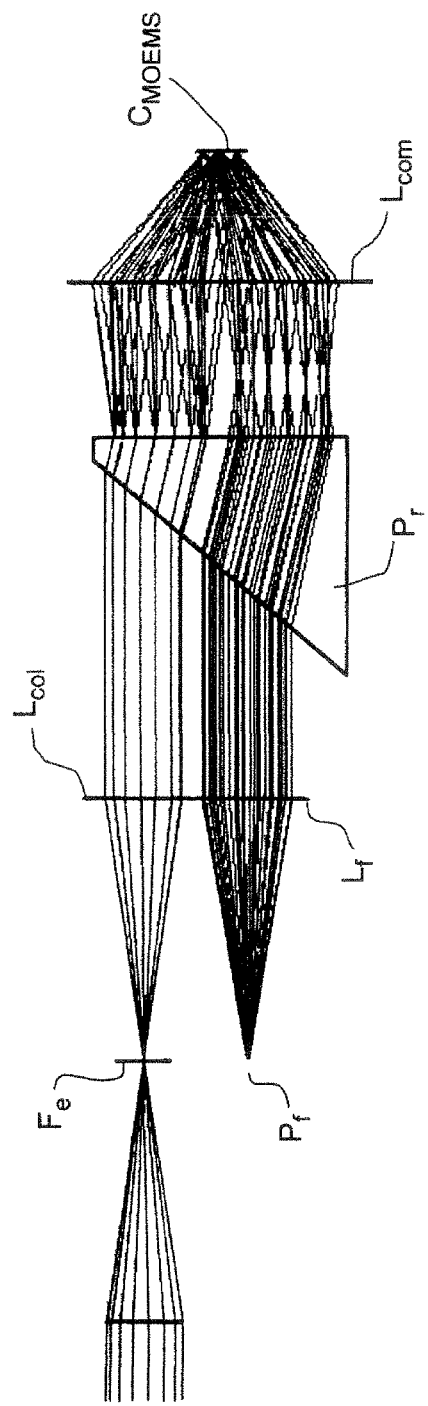
FIG. 6 illustrates a third exemplary imaging device according to the invention in which the optical combinations are highlighted.
Figure 10A:
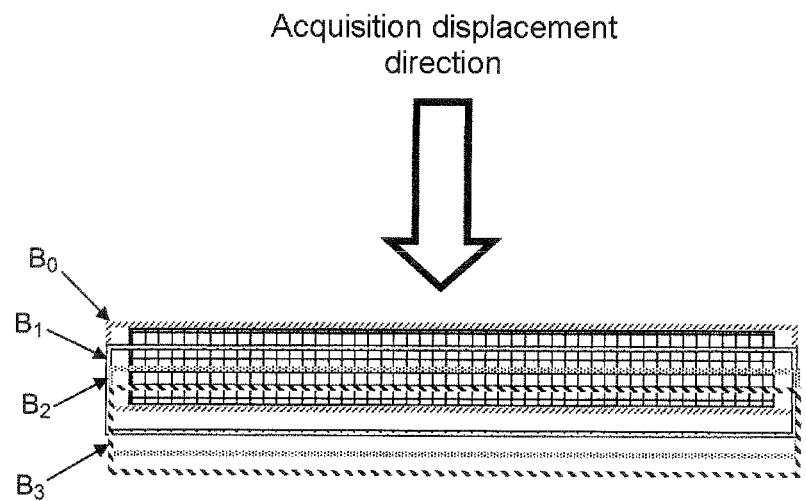
FIGS. 10a and 10b illustrate the addressing of the filtering functions coupled to the displacement of the strips of detectors in an inventive device.
Figure 10B:
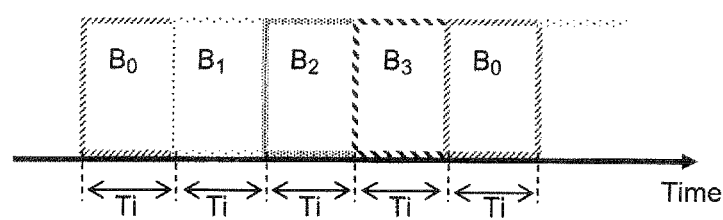

FIG. 6 illustrates a third exemplary device according to the invention in which the dispersing element is a prism $P_r$. According to this example, the beam $\Sigma F_R$ is sent toward the component $C_{MOEMS}$ through a collimation lens $L_{col}$ toward the prism which disperses it in a beam $\Sigma F_R{}'$ sent to a focusing lens $L_f$ toward the focal plane $P_f$ of the detection lines.

Figure 7:
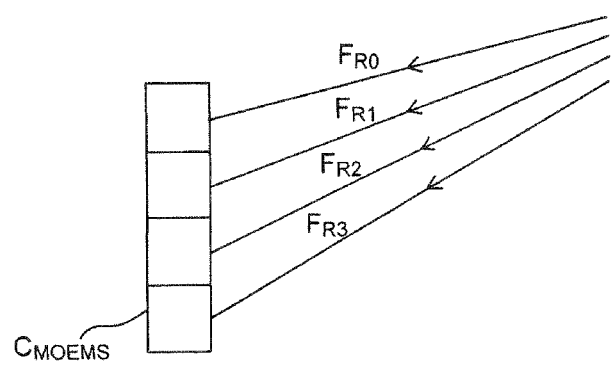
FIG. 7 illustrates in more detail the behavior of the MOEMS-based filter used in the inventive device.

The diagram of FIG. 7 illustrates in more detail the diffracted beams, in this case four represented $F_{R0}$, $F_{R1}$, $F_{R2}$ and $F_{R3}$, sent toward different sectors of locally-controllable components so as to be able to locally reflect or not reflect a determined wavelength.

There now follows a more detailed description of the behavior of this type of component. It is a microstructure that can provide a mirror function with regard to a multispectral light beam as illustrated in FIG. 8a. FIG. 8b relates to a cross-sectional view of the structure represented in FIG. 8a. Under the effect of an applied electrical field, and by electrostatic force, certain unitary elements $M_{oi}$ may be brought closer to the substrate so creating an array structure as illustrated in FIGS. 9a and 9b. Typically, the elements $M_{oi}$ can have lengths of around a few tens of microns for widths of around a few microns. Arrays of micro-mirrors are thus produced that are capable of reflecting or not reflecting the light beam $F_i$ and that can be electrically driven.

According to the invention, when beams $F_{R0}$, $F_{R1}$, $F_{R2}$, $F_{R3}$, respectively centered on the wavelengths $\lambda_0$, $\lambda_1$, $\lambda_2$, $\lambda_3$ with spectral bandwidths $\Delta\lambda_0$, $\Delta\lambda_1$, $\Delta\lambda_2$, $\Delta\lambda_3$, arrive on a component $C_{MOEMS}$, as illustrated in FIG. 7, certain wavelengths may be switched off or dispersed so as to restore, in reflection and in a given direction, beams having spectral bands that are partially filtered compared to the beams $F_{R0}$, $F_{R1}$, $F_{R2}$, $F_{R3}$. By rerouting these partially filtered beams toward the array R, these different beams are recombined by virtue of the reverse principle of light.

Thus, more specifically, the MOEMS component can be driven successively so that it reflects, for example, in succession:

the beams $F'_{R1}$, $F'_{R2}$, $F'_{R3}$ corresponding to an emission band called $B_0$;
the beams $F'_{R0}$, $F'_{R2}$, $F'_{R3}$ corresponding to an emission band called $B_1$;
the beams $F'_{R0}$, $F'_{R1}$, $F'_{R3}$ corresponding to an emission band called $B_2$;
the beams $F'_{R0}$, $F'_{R1}$, $F'_{R2}$ corresponding to an emission band called $B_3$.

Since the integration time by a row of strips of detectors is $T_{in}$, advantageously and according to the invention the filtering functions are swopped concomitantly, also every $T_{in}$, so that a set of four strips of diodes can integrate all of four "colored" images. In practice, as illustrated in FIG. 8a, firstly the four strips of detectors $D_0$, $D_1$, $D_2$, $D_3$ integrate filtered images with the band $B_0$, then, when the satellite has moved by a unit equivalent to a distance equal to the pitch of a detector strip (typically this pitch can be of the order of around 10 microns corresponding to a distance on the ground of a few tens of meters, unlike the few kilometers in observation obtained with the filters of the prior art), the four strips integrate filtered images with the band $B_1$, and so on so that, after a time equal to $4T_{in}$ as diagrammatically illustrated in FIG. 8b, each of the strips has integrated all of the four colored images with the four filtering functions. It is thus possible to control, typically after a time $T_{in}$ of the order of a microsecond, the change of filter needed to acquire a color image. The invention described here consists (for example in the case of four spectral bands) in using a matrix detector with four rows of detectors. However, generally, the number of rows of detectors and the number of spectral bands can advantageously be set by having N rows for N spectral bands.

Thus, according to the invention, the spectral function (spectral band) is varied cyclically (B0->B1->B2->B3->B0 . . . ) with the same period as the integration time (displacement equivalent to one row). A scene can then be observed successively in the four spectral bands. The benefits of this solution lie in the absence of match filters and the possibility of easily increasing the number of bands. The spectral profile can also be easily programmed from the ground.

The invention claimed is:

1. A multispectral imaging device for satellite observation by "push broom" scanning over an observed area, operating in N wavelength bands, where N is greater than one, each band respectively centered on a first wavelength ($\lambda_1$) through an Nth wavelength ($\lambda_N$) comprising:
   a. a light source emitting a beam in each of the N wavelength bands;
   b. a wide-field optic for collecting the beam from the light source;
   c. N rows of detectors ($L_1, \ldots, L_N$) for acquiring images of the observed area in differing emission bands ($B_0$, $B_1$, $B_2$, $B_3$); and
   d. an optical filter located in an optical path between the wide-field optic and the N rows of detectors further comprising:
      i. a first dispersion element ($R_1$, R) for dispersing the collected beam into N wavelength bands;
      ii. at least one micro-opto-electro-mechanical system (MOEMS) for receiving the N wavelength bands and applying N filtering functions to the N wavelength bands, wherein the MOEMS is configured to reflect only certain wavelength bands;
      iii. a controller for the MOEMS configured to select one of the N filtering functions as a selected filtering function and vary the selected filtering function with a period equivalent to an acquisition time for an image corresponding to a displacement time equivalent to a scrolling row of detectors facing the observed area; and
      iv. a second dispersion element ($R_2$) for the purpose of recombining all reflected wavelength bands corresponding to the differing emission bands ($B_0$, $B_1$, $B_2$, $B_3$) at the output of the filter, wherein the device is configured to move perpendicular to a direction of displacement (D) of the observed scene.

2. The satellite observation imaging device as claimed in claim 1, wherein the first dispersion element (R1, R) is a prism, an array, or a component comprising the array and the prism functions.

3. The satellite observation imaging device as claimed in one of claim 1 or 2, wherein the second dispersion element is a prism, an array, or a component comprising the array and the prism functions.

4. The satellite observation imaging device as claimed in one of claims 1 or 2, wherein the first dispersion element (R1, R) and second dispersion element (R2) are the same component.

5. The satellite observation imaging device as claimed in one of claim 1 or 2, wherein the MOEMS comprises a micro-mirror structure suspended relative to a substrate, of Which the distance or the angle with the substrate is controlled electrically.

6. The satellite observation imaging device as claimed in claim 5, wherein the micro-mirror structure comprises unitary elements having lengths of a few tens of microns and widths of a few microns.

7. The satellite observation imaging device as claimed in claim 6, wherein the unitary elements are separated by a pitch of a few microns.

8. The satellite observation imaging device as claimed in claim 1 wherein the controller can be programmed from the ground.

* * * * *

UNITED STATES PATENT AND TRADEMARK OFFICE
CERTIFICATE OF CORRECTION

PATENT NO. : 8,854,619 B2  
APPLICATION NO. : 12/667515  
DATED : October 7, 2014  
INVENTOR(S) : Thierry Viard et al.

Page 1 of 1

It is certified that error appears in the above-identified patent and that said Letters Patent is hereby corrected as shown below:

In the Specification:

Column 3, line 66, delete "$P._r$" and insert --$P._f$--;

Column 4, line 43, delete "$F._{R0}$" and insert --$F'._{R0}$--;

Column 4, line 45, delete "$F._{R0}, F._{R1}$" and insert --$F'._{R0}, F'._{R1}$--.

In the Claims:

Claim 5, column 6, line 24, delete "Which" and insert --which--.

Signed and Sealed this  
Tenth Day of February, 2015

Michelle K. Lee  
*Deputy Director of the United States Patent and Trademark Office*